United States Patent
Woller

(12) 
(10) Patent No.: US 6,397,973 B1
(45) Date of Patent: Jun. 4, 2002

(54) NON-CLIMBING TREE STAND WITH CABLE ATTACHMENT

(75) Inventor: Ronald R. Woller, Decatur, AL (US)

(73) Assignee: Summit Specialties, Inc., Decatur, AL (US)

( * ) Notice: Subject to any disclaimer, the term of this patent is extended or adjusted under 35 U.S.C. 154(b) by 0 days.

(21) Appl. No.: 09/227,628

(22) Filed: Jan. 8, 1999

Related U.S. Application Data

(63) Continuation-in-part of application No. 09/191,293, filed on Nov. 13, 1998, now Pat. No. 5,975,242.
(60) Provisional application No. 60/071,089, filed on Jan. 9, 1998.

(51) Int. Cl.$^7$ .............................. E04G 3/00; A63B 27/00
(52) U.S. Cl. ........................................ 182/187; 182/135
(58) Field of Search ................................. 182/187, 188, 182/135, 136; 24/299, 71 J, 68 CD, 129 A, 16 PB

(56) References Cited

U.S. PATENT DOCUMENTS 2,982,337 A  *  5/1961  Arena ........................ 182/187

* cited by examiner

Primary Examiner—Daniel P. Stodola
Assistant Examiner—Hugh B. Thompson
(74) Attorney, Agent, or Firm—Gardner Groff & Mehrman, P.C.

(57) ABSTRACT

A non-climbing tree stand for hunting or other outdoor activities includes a platform and a tubular frame connected thereto and at least partly supporting the platform. A yoke is connected to the platform for engaging the tree and a cable couples the platform to the tree with the ends of the cable carrying a series of nuts securely mounted there adjacent. A cable retention bracket is detachably mounted to the tubular frame for releasably securing the cable ends using the nuts on the cables. The cable retention bracket includes keyhole-shaped openings for receiving portions of the cable. The yoke includes two sections which are oriented at an acute angle with respect to each other to partly straddle the tree.

13 Claims, 3 Drawing Sheets

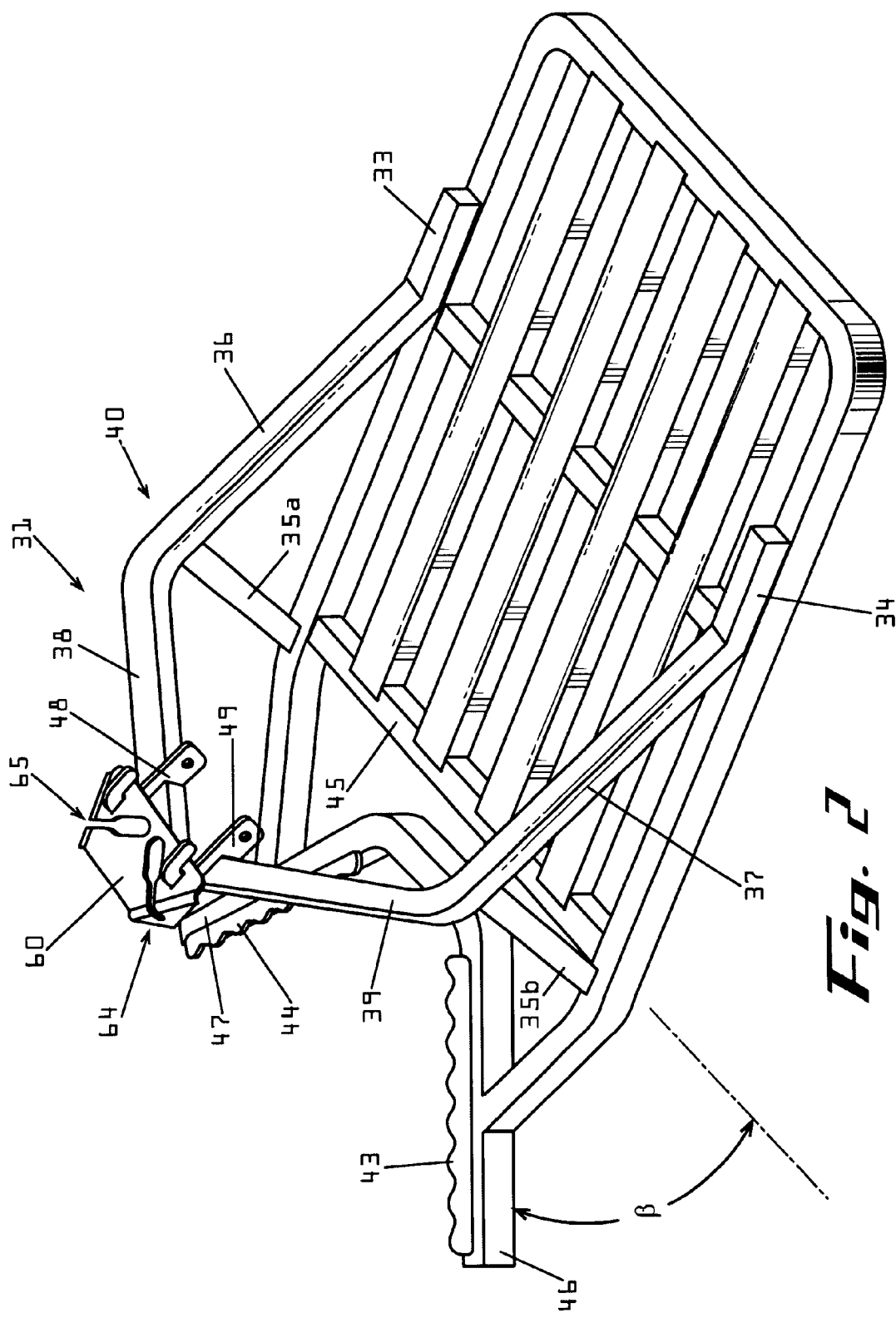

NON-CLIMBING TREE STAND WITH CABLE ATTACHMENT

CROSS-REFERENCE TO RELATED APPLICATION

The present application is a continuation-in-part of U.S. patent application Ser. No. 09/191,293 filed on Nov. 13, 1998, now U.S. Pat. No. 5,975,242 which in turn is a continuation-in-part of U.S. Provisional Patent Application Ser. No. 60/071,089 filed on Jan. 9, 1998.

TECHNICAL FIELD

The present invention relates to non-climbing tree stands for attachment to trees.

BACKGROUND OF THE INVENTION

Outdoorsmen, such as hunters, naturalists, and photographers, often need to gain an elevated vantage point. In this regard, it has been common to use a non-climbing tree stand to provide a stable platform above the ground. Numerous designs involving a variety of construction techniques for non-climbing tree stands are known.

A common arrangement for a non-climbing tree stand is a lower platform having an adjustable, rigid backbar which is placed about the tree and secured to the platform for securing the platform to the tree. The rigid backbar often has been made of tubular steel or heavy gauge plate steel. In U.S. Pat. No. 5,316,014 of Amacker, the backbar is rigidly secured to a first pair of steel tubes which are telescopically received in a slightly larger pair of steel tubes, with the position of the backbar then being adjusted by means of a locking pin inserted through the telescoping tubes into holes formed in the inner tube.

In recent years, it has become somewhat common to replace the rigid backbar with a length of cable or a chain in order to reduce weight. One difficulty in the use of cable or chain is that the resulting tree stand often has less than optimal stability. Another problem is that the attachment and adjustment of the cable or chain to the platform can be difficult to accomplish, particularly under adverse conditions (such as in the dark or cold or rain). In this regard, it is pointed out that some of the known prior art tree stands using cables or chains have used square tubing attached to the ends of the cables or chains and telescopically received in other pieces of tubing, as described in the Amacker patent above. Other known prior art arrangements have replaced the square tubing with round tubing, which in addition to requiring axial alignment of the tubes in order to insert the locking pin, further complicates matters by requiring radial alignment as well. This can be very difficult to accomplish in the field.

Accordingly, it can be seen that a need yet remains for a non-climbing tree stand which is lightweight, stable, easily adjusted, and easily used. It is to the provision of such a non-climbing tree stand that the present invention is primarily directed.

SUMMARY OF THE INVENTION

Briefly described, in a preferred form the present invention comprises a non-climbing tree stand for hunting or other outdoor activities. The non-climbing tree stand includes a platform and a tubular frame connected thereto and at least partly supporting the platform. A yoke is connected to the platform for engaging the tree. A cable couples the tubular frame to the tree, and at least one end of the cable has a series of nuts securely mounted there adjacent. A cable retention bracket is detachably mounted to the tubular frame for releasably securing one of the nuts of the cable.

Preferably, an opposite end of the cable has another series of nuts securely mounted there-adjacent and the cable retention bracket comprises keyhole-shaped openings for receiving a section of the cable with a nut thereon and for avoiding accidental disengagement of the nut from the cable retention bracket. Preferably, the nuts comprise ferrules which have been swaged onto the cable.

Preferably, the tubular frame includes hooks and the cable retention bracket includes openings for cooperating with the hooks for detachably securing the tubular frame to the cable retention bracket. Also, preferably the tubular frame is pivotally mounted to the cable retention bracket using the hooks. Also preferably, the cable retention bracket is positioned rather centrally between the sides of the platform and is small enough that even with two ends of the cable attached thereto, the cable retention bracket functions much like a single attachment point.

Preferably, the tubular frame includes members which are oriented at an angle with respect to the platform. Also preferably, the yoke is adapted to at least partly straddle the tree and has scalloped, tree-engaging faces to resist slippage.

In another preferred form, the invention comprises a non-climbing tree stand for use with a tree which includes a platform and a tubular frame connected to the platform for at least partly supporting the platform next to a tree. A tree-engaging yoke is connected to the platform and comprises first and second sections which are oriented at a non-zero acute angle with respect to one another.

In another preferred form, the invention comprises a method of securing a non-climbing tree stand to a tree. The method includes the steps of first draping the cable around the tree and then securing the ends of the cable to a cable retention bracket. One then mounts a support platform and support frame assembly to the cable retention bracket to secure the platform and support frame assembly to the tree. Preferably, the cable is mounted to the cable retention bracket using keyhole-shaped openings formed in the cable retention bracket. Also preferably, the platform and support frame assembly are mounted to the cable retention bracket using hooks and openings for receiving the hooks so that the platform and support frame assembly are pivotally mounted to the cable retention bracket.

The non-climbing tree stand according to the invention has numerous advantages. For example, the use of the cable helps to minimize weight and makes it easier to carry. Moreover, the use of the nuts formed on the cable together with the cable retention bracket makes it easy to attach and use the non-climbing tree stand on a tree. Also, the keyhole-shaped openings in the cable retention bracket make the engagement with the nuts of the cable very stable, reliable, and fool-proof. The use of a series of nuts on the ends of the cable also makes the non-climbing tree stand very easy to adjust. Moreover, the resulting tree stand is very stable and has no projecting parts to snag clothing or equipment. Also, the resulting non-climbing tree stand is extremely stable, even as the user's weight shifts around on the platform. Also, it is very simple to mount to a tree, particularly owing to the method of first securing the cable and the cable retention bracket before mounting the platform and support frame to the cable retention bracket.

Accordingly, it is a primary object of the present invention to provide a non-climbing tree seat which is economical to manufacture, durable in use, and highly effective.

It is another object of the present invention to provide a non-climbing tree stand which is lightweight.

It is another object of the present invention to provide a non-climbing tree stand which can be easily operated, even in low light or other adverse conditions.

It is another object of the present invention to provide a non-climbing tree stand which is simple in its construction and is easily adjusted.

It is another object of the present invention to provide a non-climbing tree stand which is stable in use.

It is another object of the present invention to provide a non-climbing tree stand which is quiet in use and during transport.

These and other objects, features, and advantages of the present invention will become more apparent upon reading the following specification in conjunction with the accompanying drawing figures.

BRIEF DESCRIPTION OF THE DRAWING FIGURES

FIG. 2 is a perspective illustration of a portion of the non-climbing tree stand of FIG. 1.

FIG. 3 is a perspective, partially exploded, detailed illustration of a portion of the non-climbing tree stand of FIG. 1.

DETAILED DESCRIPTION OF THE PREFERRED EMBODIMENTS

Figure 1:
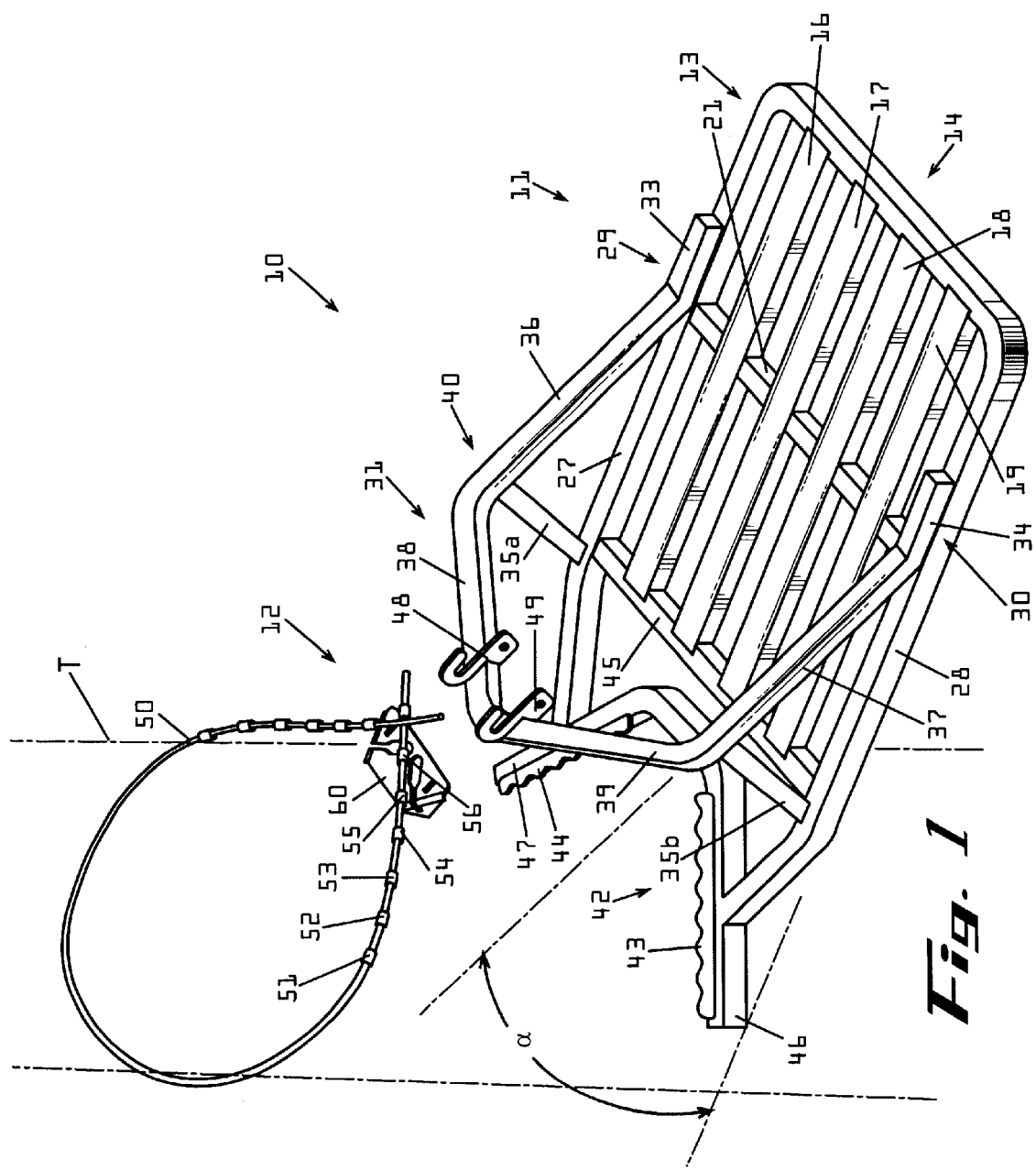
FIG. 1 is a perspective, partially exploded illustration of a non-climbing tree stand according to a preferred form of the invention, shown in conjunction with a tree trunk.
Figure 1:
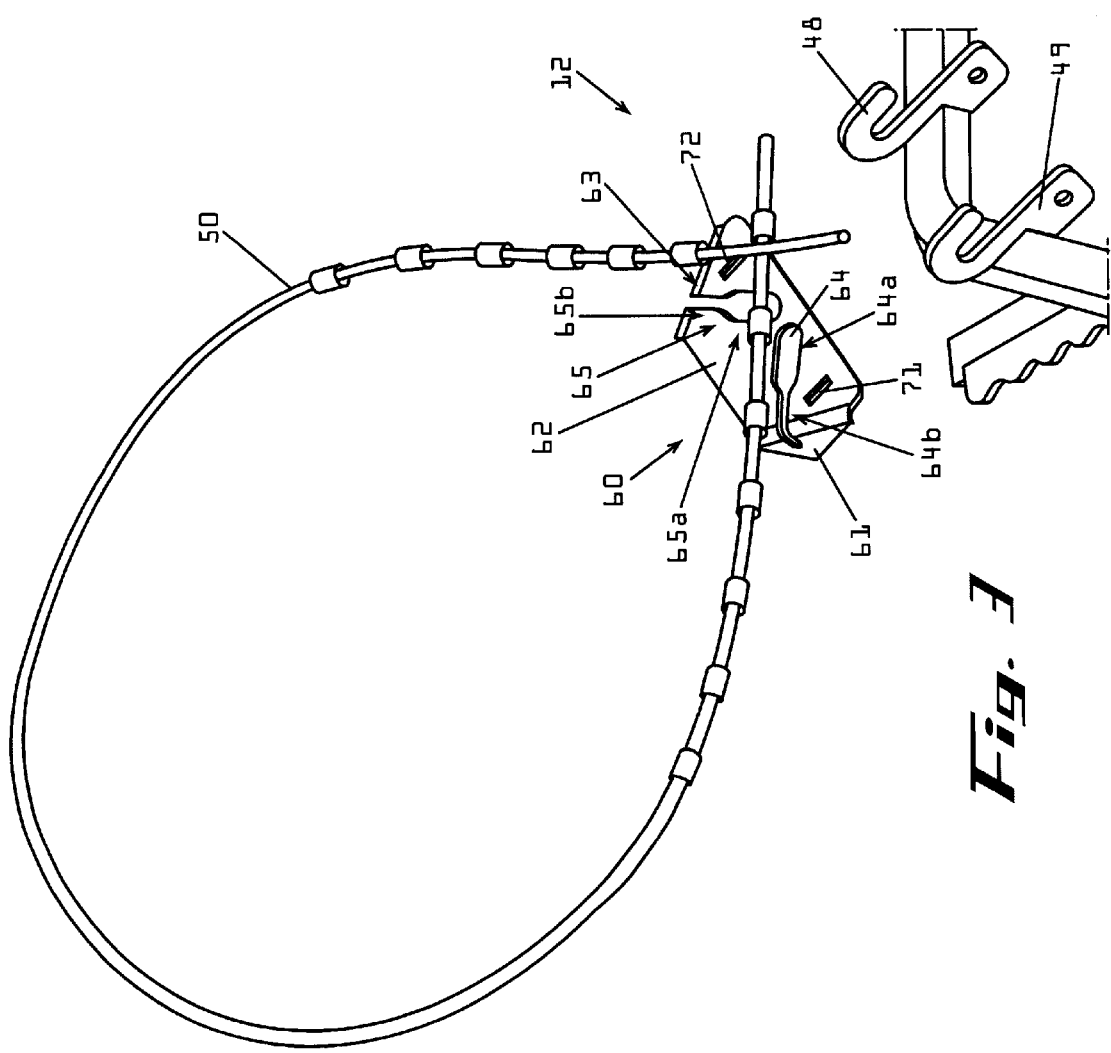

Referring now in detail to the drawing figures, wherein like reference numerals represent like parts throughout the several views, FIGS. 1–3 show the non-climbing tree stand 10 according to a preferred form of the invention. The non-climbing tree stand 10 is shown in FIG. 1 in use with a tree trunk T. However, those skilled in the art will readily recognize that the non-climbing tree stand can be used with poles, such as utility poles, as well. Also, while the non-climbing tree stand 10 is shown by itself, those skilled in the art will recognize that the tree stand often will be used in conjunction with a tree seat to facilitate the comfortable use of the stand over prolonged periods of time.

As shown in FIGS. 1–3, the non-climbing tree stand 10 includes a rigid platform structure indicated at 11 and a cable attachment indicated at 12. The rigid platform structure 11 includes a platform assembly indicated at 13. The platform assembly 13 includes a peripheral frame assembly 14 and a series of slats, such as slats 16–19. Extending beneath the slats and between the outer-most sides of the peripheral frame assembly 14 is a cross-beam 21.

The peripheral frame assembly 14 also includes side frame members 27 and 28, as well as a generally U-shaped platform frame 31. The side frames 27 and 28 are welded to the U-shaped platform frame 31 in the vicinity of regions 29 and 30.

The U-shaped platform frame 31 includes two portions which lie adjacent the plane of the platform assembly 13, namely portions 33, and 34. Moreover, the U-shaped platform frame 31 also includes two upwardly angled portions 36 and 37 for supporting the platform adjacent a tree and for attaching to the cable attachment 12 to the platform. As best seen in FIG. 1, the angled portions 36, 37 are oriented at an acute angle α with respect to the remainder of the platform 13. Preferably, the angle α is between about 10° and 40° and most preferably is about 26° or so. While 26° has been found to work very well, other angles will work also. At the ends of the upwardly angled portions 36 and 37 cable retention arms 38 and 39 are formed. Together, the support arms 38, 39 close the "bottom" of the V-shaped or U-shaped support assembly 40. The support assembly 40 is supported in part by inclined posts 35a, 35b.

A generally V-shaped yoke 42 is positioned beneath the vertex of the U-shaped support assembly 40, is welded to platform assembly 13, and faces away from the platform assembly 13. The yoke 42 is adapted for at least partly straddling the tree and will be described in more detail below.

The frame components just described are made from 18 gauge steel tubing, 13/16" inches square. The individual pieces thereof are welded together and then powder coated (painted) to avoid corrosion.

Referring again to the generally V-shaped yoke 42 of FIG. 1, the yoke includes tubular sections 46 and 47. Preferably, the inside faces 43 and 44 of the tubular sections 46, 47 are provided with a scalloped sill to help grip the tree and to avoid slippage in use.

A pair of J-shaped hooks 48, 49 are welded to the support arms 38, 39 near the apex of the U-shaped support assembly 40. The hooks also include holes formed therein for mounting a chair thereto.

Having now described the basic structure of the platform itself, attention is directed to the cable attachment 12. FIG. 1 depicts two ends of the cable shown loose adjacent the cable retention bracket. The cable attachment 12 includes a cable 50 adapted to be looped about a tree and further includes a series of cylindrical nuts (collars) formed on the cable at the ends thereof. The nuts (or sleeves), such as nuts 51–56 shown: in FIG. 1, are in the form of cylindrical ferrules that have been swaged onto the cable 50. Of course, those skilled in the art will recognize that other shapes for the nuts can be employed as well. For example, the nuts could be spherical or box-shaped. The cylindrically-shaped nuts provide good strength at a reasonable cost.

The cable 50 has an overall length of about 72" which is useful for accommodating trees having diameters from 8Δ to slightly more than 20". Each end of the cable includes six nuts. The first nut at each end of the cable is preferably 4" from the very end of the cable, and the remaining nuts are spaced 4" apart. Thus, the first nut is 4" from the end, the next nut along the cable is 4" from the first, the third nut is 4" from the second, and so on. The 4" spacing between nuts provides a good adjustment increment to accommodate different size trees (with one 4" increment between adjacent nuts corresponding to roughly a 1.25" diameter change in the tree diameter). Cable 50 preferably is a 7 by 7, 3/16" cable (that is, it is made up of a seven bundles of seven strands having a 3/16" overall diameter). Such a cable has an ultimate breaking strength of about 3700 pounds, which is more than sufficient (and includes a generous safety factor) for the loads typically placed on such a tree stand by a user.

As can be seen best in FIG. 3, the cable attachment 12 includes a cable retention bracket 60. The cable retention bracket includes a side panel 61, a top panel 62, and a side panel 63. As can be seen in the figures, the bottom of the cable retention bracket is open. The top panel 62 includes a pair of generally bottle-shaped openings or keyhole-shaped openings 64, 65 formed therein for receiving a section of cable with one or more cable nuts thereon. The bottle-shaped openings 64, 65 include a wide part 64a, 65a and a narrow part 64b, 65b. The wide part is wide enough to accommodate the cable nuts, while the narrow part is wide enough to accommodate only the cable, but will not allow the cable nuts to pass therethrough. The narrow part extends not only to the edge of the top panel 62, but also around the corner and down the side panels 61, 63. With this construction, a section of cable with a cable nut thereon can be inserted into the bottle-shaped opening with the cable slipping through the narrow portion of the side panel and the cable nut slipping through the broader portion of the opening. Once tension is applied to the cable, the nut is pulled fast against the inside face of the side panel and is held securely. Note that in such an instance, the narrow opening in the side panel prevents the cable nut from being pulled through and the narrow opening in the top panel prevents the cable nut from slipping upwardly. Thus, the cable is securely held.

The cable retention bracket 60 also includes a pair of elongate openings 71, 72 for receiving the curved ends of the J-shaped hooks 48 and 49. In this way, the platform and frame assembly is pivotally suspended from the cable retention bracket 60. While FIG. 3 best shows the shape and position of the elongate opening 71 and 72, FIG. 2 shows the interaction of the J-shaped hooks with such elongate openings.

The cable retention bracket 60 is positioned roughly centrally between the outside side edges of the platform and is relatively narrow itself. This has the result of bringing the ends of the cable together at this midpoint. This has the advantage of wrapping more of the cable around the surface of the tree, thereby increasing the grip of the cable on the tree bark.

Referring now again to FIG. 2, some other aspects of the platform and frame assembly will be considered. As shown in FIG. 2, the V-shaped yoke 42 includes first and second tubular sections 46 and 47, each of which is oriented at an angle β of 56° with respect to the transverse frame member 45. As a result, the included angle between the tubular sections 46 and 47 is 68°. It has been found that this angle is particularly effective for engaging a tree and results in the yoke at least partly straddling the tree over a wide range of diameters, including trees having diameters between about 8" and slightly more than 20". Applicant has also found that an included angle of 72° works very well too.

To mount the non-climbing tree stand-to a tree one first drapes the cable 50 around the trunk of a tree. Next, the cable 50 is attached to the cable retention bracket 60 using the keyhole-shaped openings 64, 65. With the cable and cable retention bracket now secured to the tree, next the platform is mounted using the hooks 48, 49. This has the advantage of making it easier to mount to a tree since one needn't hold the platform while attaching the cable.

The non-climbing tree stand according to the invention has numerous advantages. Firstly, the use of a cable greatly reduces the weight of the non-climbing tree stand. By eliminating the tubular metal backbar and the attendant hardware associated with connecting it to the platform, a weight savings of more than 7 pounds can be achieved by using the cable and the cable retention bracket. This greatly improves the portability of the non-climbing tree stand. Also, a non-climbing tree stand according to the invention allows for a very simple, reliable, and easily accomplished connection of the cable with the cable retention bracket. This is in stark contrast to the known prior art arrangements which require careful alignment (some require axial alignment, while others require both axial alignment and radial alignment) of an opening within a tube in order to receive a locking pin therethrough to secure a cable. Also, the non-climbing tree stand according to the invention is extremely stable and quiet. It also presents a very uncluttered structure, leaving fewer things on which one might snag clothing, equipment, foliage, etc.

The invention provides unparalleled platform stability while still using a flexible cable, band, or chain. In this regard, the acute angle of the yoke causes the transverse or lateral reactions (forces) to be greater than the longitudinal reactions (i.e., the side-gripping forces exceed the front-gripping forces). Moreover, the present invention allows for an attachment to the tree with no pins, bolts, knobs, or other locking devices prior to using the invention. The simplicity of the invention allows it to be used in low-light situations reliably. Moreover, there are no loose parts to drop on the ground.

The acute angle of the tree-engaging yoke allows a free span of cable between the cable retention bracket and the contact point of the tree. This free span allows the vertical separation between the contact points of the cable and the engagement yoke to be varied, thereby changing the pitch of the tree stand platform.

While the invention has been shown and described in preferred forms, it will be apparent to those skilled in the art that many modifications, additions, and deletions can be made therein. For example, one end of the cable could be permanently mounted to the tubing and the quantity of nuts on the other end could be increased or decreased. Also, the cable could be replaced with solid wire or with chain. These and other changes can be made without departing from the spirit and scope of the invention as set forth in the following claims.

What is claimed is:

1. A non-climbing tree stand for use with a tree comprising:
   a platform;
   a tubular frame connected to the platform for supporting the platform adjacent a tree, the tubular frame being arranged at a non-zero angle with respect to the platform;
   engagement means connected to the platform for engaging the tree; and
   a cable retention bracket for securing a cable around the tree and to the tubular frame, wherein the cable retention bracket is detachably secured to the tubular frame approximately midway between outside edges of the platform and the cable has a series of nuts positioned adjacent at least one end for releasable retention to the cable retention bracket.

2. A non-climbing tree stand as claimed in claim 1 wherein said cable retention bracket comprises at least one keyhole-shaped opening for receiving a section of said cable with a nut therein and for avoiding accidental disengagement of said nut from said cable retention bracket.

3. A non-climbing tree stand as claimed in claim 2 wherein said cable retention bracket is oriented so that with said non-climbing tree stand attached to a tree said at least one keyhole-shaped opening faces generally upwardly.

4. A non-climbing tree stand as claimed in claim 1 wherein said engagement means comprises a yoke adapted for at least partly straddling the tree, and wherein said yoke includes first and second tree-engaging sections oriented at an acute angle with respect to one another.

5. A non-climbing tree stand as claimed in claim 4 wherein said acute angle is greater than about 50°.

6. A non-climbing tree stand as claimed in claim 4 wherein said acute angle is about 70°.

7. A non-climbing tree stand as claimed in claim 1 wherein said nuts comprise cylindrical ferrules swaged onto said cable.

8. A non-climbing tree stand for use with a tree comprising:
- a platform;
- a tubular frame connected to the platform for supporting the platform adjacent a tree, the tubular frame being arranged at a non-zero angle with respect to the platform;
- engagement means connected to the platform for engaging the tree; and
- a cable retention bracket for securing a cable around the tree and to the tubular frame thereby coupling the platform with the tree, wherein the tubular frame includes hooks and the cable retention bracket includes openings for cooperating with the hooks for detachably securing the tubular frame to the cable retention bracket, and the cable has a series of nuts positioned adjacent each end of the cable for releasable retention to the cable retention bracket.

9. A non-climbing tree stand as claimed in claim 8 wherein the cable retention bracket is detachably secured to the tubular frame approximately midway between the outside edges of the platform.

10. A non-climbing tree stand as claimed in claim 8 wherein said engagement means comprises a yoke adapted for at least partly straddling the tree, and wherein said yoke includes first and second tree-engaging sections oriented at an acute angle with respect to one another.

11. A non-climbing tree stand as claimed in claim 10 wherein said acute angle is greater than about 50°.

12. A method of securing a non-climbing tree stand to a tree, the tree stand including a platform mounted to a support frame assembly, the method comprising the steps of:
- draping an attachment cable around the tree;
- securing ends of the attachment cable to a cable retention bracket; and
- detachably mounting the support frame assembly to the cable retention bracket approximately midway between outside edges of the platform to secure the platform and the support frame assembly to the tree.

13. A non-climbing tree stand for use with a tree comprising:
- a platform;
- a tubular frame connected to the platform for supporting, the platform adjacent a tree, the tubular frame being arranged at a non-zero angle with respect to the platform;
- engagement means connected to the platform for engaging the tree; and
- a cable retention bracket for securing a cable around the tree and to the tubular frame, wherein the cable retention bracket is detachably secured to the tubular frame approximately midway between outside edges of the platform, the tubular frame is pivotally mounted to said cable retention bracket and the cable has a series of nuts positioned adjacent at least one end for releasable retention to the cable retention bracket.

* * * * *